United States Patent [19]

Lewis et al.

[11] Patent Number: 4,810,506
[45] Date of Patent: Mar. 7, 1989

[54] TREATMENT OF GRAIN PRODUCTS

[76] Inventors: Victor M. Lewis; David A. Lewis, both of 19A Boundary Street, Rushcutters Bay, New South Wales, Australia, 2011

[21] Appl. No.: 101,647

[22] Filed: Sep. 28, 1987

Related U.S. Application Data

[63] Continuation of Ser. No. 887,100, Dec. 30, 1985, abandoned.

[30] Foreign Application Priority Data

Apr. 9, 1984 [AU] Australia ................................ PG4490

[51] Int. Cl.$^4$ ............................................. A23L 1/105
[52] U.S. Cl. ........................................ 426/28; 426/18; 426/52; 426/618
[58] Field of Search ........................ 426/28, 52, 63, 64, 426/618, 18–20, 61

[56] References Cited

U.S. PATENT DOCUMENTS 2,289,416  7/1942  Fine et al. ............................. 426/28
2,494,544  1/1950  Erlich .................................... 426/28

FOREIGN PATENT DOCUMENTS 0495512  1/1977  Australia ............................. 426/618

Primary Examiner—Marianne Cintins
Attorney, Agent, or Firm—Scully, Scott, Murphy & Presser

[57] ABSTRACT

The invention relates to a process of producing a grain product for human consumption which comprises subjecting parboiled grain to treatment with a measured quantity of a solution containing water and an enzyme or enzymes. The quantity of the solution is such that it is totally absorbed by the grain and subsequently removing the surface moisture from the grain. Preferably the parboiled grain is subject to compression while still hot by passing the grain between rollers prior to treatment with the enzyme containing solution.

6 Claims, No Drawings

TREATMENT OF GRAIN PRODUCTS

This is a continuation of copending application Ser. No. 887,100, filed on Dec. 30, 1985 now abandoned.

Rice is prepared for table consumption in various ways, the most common of which is by cooking whole grains from the dry state using various cooking procedures. Rice is also precooked, then ground to a flour for use in infant and invalids foods. Rice is also toasted to develop an expanded light texture and a lightly toasted or browned flavour. Such rice is used as a breakfast cereal and also finds application in certain confectionery products such as "Granola" bars, "Muesli" bars and in other product applications where a light crispy texture and low bulk density is desired. Toasted expanded ready-to-eat rice is hereafter referred to as "crisped rice".

Rice for cooking (hereafter referred to as cooking rice) often suffers from a tendency for the cooked rice to finish up sticky, gluggy and cohesive, both when freshly cooked and on cooling. On cooling, cooked rice often becomes excessively firm. By contrast, most consumers prefer cooked rice to be of a fluffy texture with the grains separate and non-sticky, yet still reasonably firm. The present invention from one aspect relates to rice which is (a) significantly less sticky, or not sticky at all when cooked, or when it has cooled down after cooking; (b) when cooked and cooled is not excessively firm. From this aspect the invention is applicable to regular rice, but is particularly applicable to quick-cooking rice. It is also applicable to other grains, particulate grain products and pasta.

Crisped rice often suffers from being too heavy (i.e. too high a bulk density), and has a tendency of having a high proportion of broken grains. Rice of this type is costly to produce and it is difficult for the processor to maintain manufacturing specifications, particularly those relating to bulk density and wholeness. The present invention from another aspect relates to the production of crisped rice in an economical way, and with the ability also to be able to produce a product of particular bulk density and degree of grain wholeness by easy adjustment and control of the process whereby the crisped rice is produced. The invention is also applicable to certain other grains or grain particles both for cooking and for crisping.

Other important advantages will be apparent from the description of the process and the products.

The present invention utilises "low moisture enzyme treatment" hereafter called LMET.

The term LMET is used here to describe the treatment of grains, grain particles or products with enzymes, expecially amylases but also, to a lesser extent, proteases, whereby the enzymes, in aqeous solution or dispersion, with or without other substances, are absorbed by the grain in totality such that the moisture content of the product, after having totally absorbed the enzyme-bearing solution is at a very low level, for example 16-30% approximately, more usually 19-26%, except that in the case of treatment of pasta the moisture content is in the approximate range of 27-35%, more especially 29-33% as is required for the extrusion or sheeting of pasta products during their normal manufacture.

Such low levels of moisture as specified above, in relation to treatment of foods with enzymes is quite unusual since it is usual when using enzymes on starch substrates to treat the gelatinised starch in water with amylases at a starch concentration of 10–15% or occasionally up to 20%. With particulate substances steeped in aqueous enzyme solutions it may be possible to work at a substrate concentration as low as 44 or 45% (calculated on the basis of the ratio—substrate:substrate+water).

LMET has many advantages, namely:

(1) large volumes of liquids are not required, nor is it necessary to carry out steeping and draining operations all of which are messy, requiring the use of tanks and other ancillary equipment. High moisture treatments are subject to wastage and lack of precise control when used in commercial operations;

(2) the grain product, once moistened, rapidly absorbs the small amount of enzyme solution and quickly becomes free flowing and easy to handle;

(3) because of the low moisture content of the product final drying operations are quick and economical;

(4) because the enzyme solution is fully absorbed by the product, the concentrations of enzyme, moisture and any other substances added are known precisely;

(5) this allows for simple ways of varying the nature of the treatment and hence the degree of effect achieved.

The desirable effects of LMET on both the cooking quality of rice and other products described as well as on the expansion of crisped grains, is quite unexpected. Indeed, it is surprising that under the relatively low moisture conditions described, the enzymes have any effect on the products, since we have not found descriptions of the use and effectiveness of enzymes under such low moisture conditions. The precise mechanism of these desirable effects is not known for certain. However, it is believed that the enzyme treatment under the conditions described has a limited but effective influence on the gelatinised matrix or crystal structure of the grain. In the case of grains to be crisped, the enzyme is considered to have a relaxing effect on the otherwise confining influence of the gelatinised matrix so that when the treated material is toasted at the high temperature used, the moisture vapour and other gases can act to expand the grain structure to a greater extent than is possible when the matrix has not been subjected to the influence of LMET.

With respect to the effect of LMET on products for cooking, such as quick-cooking parboiled rice, we consider the relaxing effect of the enzymes on the gelatinised starch chains in the integral grain tissue or in pasta, as the case may be, results in the easier access of cooking water to the dry interior part of the tissue or food material. It is believed that the enzyme under the conditions of LMET is probably effecting a minimal and controlled rupturing of the starch molecules to produce intermolecular channels whereby the moisture may more readily gain access into the interior parts. At the same time, the reduced cohesiveness of grains or pasta which have been subjected to LMET probably resides in the solubilisation of the loose surface starch or free starch molecule chains at the surface of the grains or other products. It is believed that the stickiness, gluggi-ness or cohesiveness of many cooked starchy particulate foods is caused by loose starch on the surface and by free starch molecule chains at the surface of the food particle which are not bound into the well-integrated matrix of the body of the food particle. By solubilising this surface starch or loose superficial starch molecule chain, this cohesive tendency is substantially reduced or eliminated. In the case of pasta, the effect is extremely useful in that by having in situ the described enzyme system, and especially having it at the surface of the pasta, the loose starch and the free surface starch molecule chains are rapidly solubilised during the initial moments in cooking in water.

It is considered that the removal of free surface starch and stickiness as described is responsible for the less starchy cooked flavour of pasta or other foods which have been subjected to LMET treatment (as compared to regular products). In addition, removal of this stickiness allows for ready cooking in much smaller volumes of water than is normal, or by total absorption, since the cooking water does not contain dispersed starch to the extent that is the case when regular products are cooked in a limited amount of water or by total absorption.

The invention according to one form resides in a process of producing a grain product which comprises subjecting parboiled grain to treatment with a measured quantity of a solution containing at least water and an enzyme or enzymes, the quantity of the solution being such that it is totally absorbed by the product and thereafter removing the surface moisture of the grains.

The invention according to another aspect resides in compressing the parboiled hot grains by passing them between rollers prior to the enyzme treatment.

The invention according to a further aspect resides in subjecting pasta or its grain components to treatment with a solution containing at least water and an enzyme or enzymes.

The invention according to a still further aspect resides in grain or pasta products which have been manufactured by the processes described herein.

Additives such as salt, sugar, minerals, vitamins, flavours and other compatible normal food ingredients may be added to the treating solution and incorporated in the treated product.

Finally the invention also includes within its scope grain products including crisped grain products having improved characteristics when processed according to the invention.

The invention will now be further described by reference to the following examples.

EXAMPLE 1

Long grain American parboiled white rice was subjected to various treatments.

Treatment A: Rice was gently mixed (in a slow speed tumbling-action device) with a measured quantity of water at a rate of 50ml per kg of rice for five minutes, then steamed in live dry steam at atmospheric pressure (100° C.) for 5 minutes. The steaming hot rice was rolled between smooth rolls set so that the gap between them was 0.32 mm. The rolled still warm rice was gently mixed with a solution comprising 1.0% by weight of an amylase enzyme preparation BAN 240L (Novo Industri, Denmark) in warm water at a rate of 100ml solution per kg original dry rice. The enzyme solution was readily absorbed by the hot-rolled rice. The rice was held warm for 15 minutes, then dried back to 12% moisture.

Treatment B: Rice was treated as in the case of Treatment A except that after hot rolling, the rice was dried directly to 12% moisture. No enzyme solution was added.

Treatment C: Rice was gently mixed with a solution of 1% amylase solution in warm water (as used in Treatment A) which was readily and totally absorbed by the rice in less than ten minutes. It was then allowed to temper for a further 5 minutes at room temperature and dried back to 12% moisture.

Treatment D: Rice was treated as in treatment C, except that the tempering period was for 15 hours (overnight) in a sealed container and at room temperature.

These treatments were all cooked and compared as shown in the following table, in comparison with the untreated control rice used as the raw material in all the tests.

| COOKING TREATMENT (lid on) | TASTING COMMENTS HOT | TASTING COMMENTS COLD | ORDER OF RATING considering all characters (Best = 1; Worst = 5) |
|---|---|---|---|
| Control: 100 g rice in 250 ml boiling water. Simmer 20 mins, let stand 5 mins. | Firm-cooked slightly sticky or cohesive on standing, starchy flavour. | Rice grains excessively firm, slightly sticky or cohesive. | 5 |
| A: 100 g rice in 200 ml boiling water. Simmer 10 mins. | Rice well cooked in 10 mins, grains extremely separate, tender. Flavour excellent, less starchy than control. Grains more tender than control. | Grains reasonably tender. Grains extremely separate and superior to control in every respect. | 1 |
| B: 100 g rice in 200 ml boiling water. Simmer 10 mins. | Rice well cooked, grains slightly cohesive. Texture slightly "rubbery". Flavour less starchy than control but not as good as A. | Rice slightly "rubbery", slightly sticky or cohesive. Grains somewhat firm but not as firm as control. | 3 |
| C: 100 g rice in 250 ml boiling water. Simmer 20 mins. | Rice well cooked and more tender than control (therefore capable of cooking in a shorter time). Flavour less starchy than control. Grains extremely separate. | Rice grains tender though slightly firmer than when hot. Grains extremely separate and non-sticky. | 2 |
| D: 100 g rice in 250 ml boiling water. Simmer 20 mins. | Rice very well cooked and much more tender than control. More | Rice grains very tender. Grains extremely separate and non-sticky. | 1 |

| COOKING TREATMENT (lid on) | TASTING COMMENTS HOT | TASTING COMMENTS COLD | ORDER OF RATING considering all characters (Best = 1; Worst = 5) |
|---|---|---|---|
| | tender than C (therefore capable of being cooked in a shorter time). Flavour less starchy than control. Grains extremely separate. | | |

While most rice is consumed in a cooked whole-grain form, there is also an important demand and need for pre-cooked rice flour or flakes for use in infant foods, gruels and other special diet foods. Existing methods for the manufacture of these products require the full pre-cooking of rice to a high moisture content, then drying of the soft rice grains or of a paste made therefrom on roller dryers. The product is accordingly very expensive to produce because of the high energy requirement and the low-capacity expensive drying equipment. We have found that by use of low-moisture enzyme treatment it is practicable and economical to produce a pre-cooked rice flour very economically, which flour is suitable for use in infant foods and the like such that addition of boiling water to the flour results in a digestible, non-starchy-tasting base for such diet foods.

EXAMPLE 2

Medium grain white rice of the variety CALROSE was tumbled with a calculated quantity of water at (60° C.) such that the moisture content of the rice increased to 27% moisture. Contained in the water used was the amylase BAN 240L at a rate of 1g of enzyme preparation per kg of dry rice. The solution was rapidly absorbed by the rice. The rice was then steamed in live dry steam at atmospheric pressure for 10 minutes, either on a batch basis experimentally or on a continuous basis using a horizontal live-steam-injected screw conveyor.

The steamed rice was completely separate, non-cohesive and non-sticky, in marked contrast to the result if no low-moisture enzyme treatment was used. (In the latter case it was quite impracticable to steam and handle successfully such rice.) The steamed rice was dried back to 12% moisture content. The grains remained completely separate and non-cohesive throughout and could be handled very readily. The dried treated rice was pulverised to a fine flour using any suitable type of grinding equipment such as a hammer mill with a fine screen. Addition of boiling water to the treated rice flour, for example at a rate of 6 parts of boiling water to 1 part of rice flour by weight, resulted instantly in a well-thickened infant food having a pleasant, non-starchy, mild flavour.

Depending on the variety of rice used and the times and temperatures for steaming, it was found possible to produce this product from rice which had been pre-hydrated to a range of moisture contents. As an alternative to the example above, the rice pre-hydrated in water was coated prior to steaming with a solution of amylase using only enough solution as would surface coat all the individual rice grains.

For the production of crisped rice by known methods, rice in dry precooked form, after having been subjected to involved and lengthy pre-preparation and flavouring steps and operations, is finally toasted in very hot rapidly moving air, typically at a temperature of 220–270° C. often in a tumbling device, under which conditions the rice rapidly expands, sets in this expanded condition, and becomes lightly toasted in colour and flavour. The toasting step may be of 20–60 seconds duration.

Such methods are described in the following publications: Rice: Chemistry and Technology ed D.F. Houston Amer. Assoc. Cereal Chemists, St. Paul, Minn, 1972 (see p402). The Chemistry & Technology of Cereals as Food & Feed ed S.A. Matz AVI Publishing Co. Inc. Westport Conn. 1959 (see p561).

Rice processed according to the invention can be expanded and toasted to produce crisped rice having improved characteristics and in a much more economical way than has been possible by known methods.

Rice treated according to the invention results in very good expansion during toasting, good texture, wholeness of grains and other desirable features. Importantly, by simple variation of the processing parameters, it is possible to vary the bulk density of the product as may be required for certain use applications for crisped rice, notably in the confectionery and snack-bar industry as well as in special bakery applications. It is also an important feature that the present invention is adaptable to the continuous production of crisped cereals.

These steps are now described in the following example:

EXAMPLE 3

Parboiled medium grain Calrose rice was treated as follows:

In Treatment A, rice was steamed in dry live steam for 5 minutes at 100° C. and then was passed between rolls (set with a gap between the rolls of 0.16mm) while the rice was very hot. The rice was then mixed with salt solution such that the contained salt (sodium chloride) was 2% of the weight of the dry rice. The solution was fully absorbed in a few minutes and the rice was allowed to temper 15 minutes, then dried to 13.5% moisture and sealed in a container so no more moisture would be lost.

In Treatment B, the same steps were followed except that the salt solution added also contained an amylase, BAN 240L (Novo Industri, Denmark) used at the rate of 1g per kg of dry rice. The solution was tempered into the rice as described, then dried as above.

In Treatment C, the same type of rice was moistened to 23% moisture, heated to 40° C., held at 40° C. for 3 hours without moisture loss, then dried to 13.5% moisture and stored sealed.

Treatment D was the same as Treatment C, except that the moistening water contained sodium chloride in an amount equal to 2% of the weight of dry rice used.

Treatment E resembled Treatment C except that the moistening water contained 1g BAN 240L (amylase )

and 0.3g NEUTRASE (a protease) per kg of dry rice used.

Treatment F resembled Treatment E except for the addition of 2% salt along with the enzymes.

The control treatment comprised Calrose parboiled rice, totally untreated, and at a moisture content of 13.5%.

All samples were toasted to allow expansion to their potential under identical conditions. The above described batches were toasted by placing the half-material in a stream of rapidly moving air at a temperature of about 230° C. until the rice was fully expanded and toasted to a light brown colour. The expanded rice was then quickly cooled to ambient temperature in moving air and its bulk density was measured. This was done by determining the weight of the quantity of crisped rice which would fill a container of known cubic capacity. Bulk density was then expressed in "grams per litre". The lower the weight the "lighter" or more bulky the toasted product. Results are presented in the following table.

| TREAT-MENT | BULK DENSITY | COMMENTS |
| --- | --- | --- |
| Control | 226 g/li | slight expansion, very firm crispy texture, light colour. |
| A | 188 g/li | reasonable expansion, firm crispy texture, light colour. |
| B | 127 g/li | good expansion, attractive light brown colour, reasonably tender. |
| C | 234 g/li | slight expansion, very firm crispy texture, light colour. |
| D | 222 g/li | slight expansion, firm crispy texture, light colour. |
| E | 167 g/li | moderate expansion, less firm crispy texture, attractive light brown colour. |
| F | 176 g/li | moderate expansion, less firm crispy texture, attractive light brown colour. |

It is apparent from these results that LMET has a marked effect on degree of expansion of rice, whether applied to rice in conjunction with rolling after steam treatment (B vs A) or whether applied to rice which is simply moistened and incubated without rolling (E and F vs C and D). While rolling contributed to a lower bulk density (as is well known from the literature), the treatment with enzymes as described results in a surprising increase in lightness (reduction in bulk density) of the crisped product. All these preferred products displayed almost 100% whole grain character, the processing having caused little or no breakage of the grains.

In the above treatments the treated rice batches at 13-14% moisture content were held in moisture-proof containers awaiting toasting to produce the final expanded crisped rice. Material at this stage, prior to toasting is called "half material". Half material may be held more or less indefinitely without change in expansion potential except for a slight decrease in bulk density potential on expansion, after the first 2 or 3 days storage.

It has also been observed that these preferred treatments, when served with milk and sugar, as is a common method of eating, retained their crispness for a considerable time and were still crispy at the end of a reasonable period as required to consume a bowl of such cereal product.

The particular enzymes used in the above treatments are not limiting. Various types of amylases have been evaluated and have been found to be reasonably suitable. For example, as an alternative to BAN 240L, we have used "TERMAMYL", a high temperature amylase; PULLULANASE, an amylase having a specificity for breakage of 1,6 glucoside linkages; commercially available mixed enzymes such as "CEREMIX", and even enzyme active malt extract. (The names in inverted commas are the trade names of enzymes prepared by NOVO INDUSTRI of Denmark). The disadvantage of malt extract is in its sticky nature, not in its enzyme activity which, however, is not as well standardised as commercial enzymes. Protease used alone is less effective and it is necessary to use an amylase along with a protease to get the best result. Similarly the concentration of enzyme preparation used may be varied and is not limited to the concentration used in the above Examples. With BAN 240L, for example, use of 10% of the amount used in treatments in Example 3 resulted in an increase in bulk density of only a few grams per litre over that of the cited example.

While the above examples have described the processing of whole grain parboiled medium grain rice, the process may also be applied to broken parboiled rice. Such broken rice is often available at lower cost. Alternatively, if for special applications small particles of crisped rice are required, whole grain parboiled rice may be cut transversely using special equipment well known and readily available to industries engaged in cereal processing. Certain minor adaptations may be required when processing broken or cut rice.

The methods described herein for processing rice by low moisture enzyme treatment, either separately or in combination, may also be applied to many other starch containing products such as cereals and pasta so as to achieve quick-cooking character and/or reduced cohesiveness or stickiness on cooking and also to achieve some novel crisped products displaying very light texture, low bulk density, extreme tenderness and pleasing flavour and mouthfeel. Some of the products which have been treated under controlled conditions as described to give a controlled degree of expansion may be used in certain snack-meal preparations whereby rapid moisture absorption results simply from the addition of very hot or boiling water to the expanded product.

In the case of pasta, quick-cooking products may be achieved simply by the incorporation of an amylase or a combination of amylases in the moisture normally used to produce the dough which is then directly extruded or sheeted in the usual way to yield the variety of well-known shapes which characterise pasta products such as spaghetti, macaroni, and the like. The pasta so produced may be cooked in a shorter period of time than is the case with regular pasta, but, most importantly, the pasta when cooked is much less cohesive or sticky than is the case with regular pasta. Indeed, using pasta manufactured as described above, or, alternately, sprayed with amylase solution after extrusion (either before or after drying), cooking may be accomplished using substantially reduced volumes of cooking water, and can even be cooked by total absorption of the cooking water. Since pasta normally requires cooking in a large excess of boiling water (e.g. 5-6 litres of water per 500g pasta), use of reduced amounts of water or cooking by total absorption represents a major saving in energy usage, time and convenience. The processing of pasta to incorporate LMET is described in the following example:

EXAMPLE 4

Samples of pasta were produced using a laboratory pasta extruder. Semolina of the drum variety was moistened to 32% moisture. Enzymes were included in the moisture used to dampen the semolina to the indicated moisture content. The dampened meal was kneaded for 15 mins, then extruded through a macaroni die and carefully dried. Results are described below:

| Treatment | Comments on Pasta when cooked 5 mins after addition to excess boiling water |
|---|---|
| Control (no enzymes added) | Undercooked, raw starchy flavour, somewhat sticky and cohesive. |
| 1 g BAN240L* per kg dry semolina | Well Cooked, good body and texture. Pleasant flavour. Very good pasta, non-cohesive and non-sticky. |
| 0.13 g Termamyl 120L* per kg dry semolina | Well cooked, quite separate and non-cohesive. |

*amylases produced by Novo Industri, Denmark

When the above treatments were cooked in a limited quantity of water so that either the water was totally absorbed or only a small quantity of excess water needed to be drained from the cooked pasta similar differences in cohesiveness relative to the control were observed. Since it is conventional for large volumes of water to be used in cooking pasta, the pasta prepared with low moisture enzyme treatment allows for considerable savings in time and energy by allowing use of a much smaller volume of water and the associated reduced requirement to bring large volumes to the boil. By cooking pasta by total absorption there is considerable improvement in retention of nutrients. In addition, LMET-pasta may be cooked in flavoured sauces without causing the dish to become sticky or starchy.

As an alternative to the above preparations of pasta, we have found that similar improvements can be achieved both in cooking time and in non-cohesiveness of the cooked pasta by coating a normal pasta dough as extruded with a spray of enzyme solution. As an example, partially dried macaroni pieces (at about 22% moisture content) were finely sprayed with a solution of BAN 240L (0.7g in 70ml water per kg of dry semolina used to make the product) along with very gentle brief agitation to uniformly spread the spray over the pasta surface. When cooked in a limited amount of water the macaroni which had been subjected to LMET was less sticky than the untreated control, and its flavour was superior. When both cooked lots were left overnight the LMET pasta was even less cohesive and also less starchy in flavour than the control. A difference such as this can be very important where pasta is used in the preparation of salads or where pasta is pre-cooked then re-heated before serving as is common in restaurants and institutions.

We claim:

1. A process for preparing an improved grain product comprising treating parboiled grain with an aqueous solution or dispersion containing at least one enzyme selected from the group consisting essentially of amylases, proteases or mixtures thereof for a time and under conditions sufficient to permit total absorption of said solution or dispersion by said grain and to permit catalyzation of said grain by said enzyme and thereafter removing the surface moisture from the treated grain, wherein the moisture content of the grain during said treatment is maintained between 16% and 30% moisture.

2. The process of claim 1 wherein said solution contains about 0.1% by weight of said enzyme.

3. The process of claim 1 wherein the treated grain is dried to a moisture content between about 12% and about 13.5% moisture.

4. The process of claim 3 wherein said dried grain is toasted to produce a crisped grain product.

5. The process of claim 1 wherein the moisture content of the grain during said treatment is between 19% and 26% moisture.

6. The process of claim 1 wherein said grain is compressed by rolling prior to treatment with said solution or dispersion.

* * * * *